Patented Aug. 23, 1932

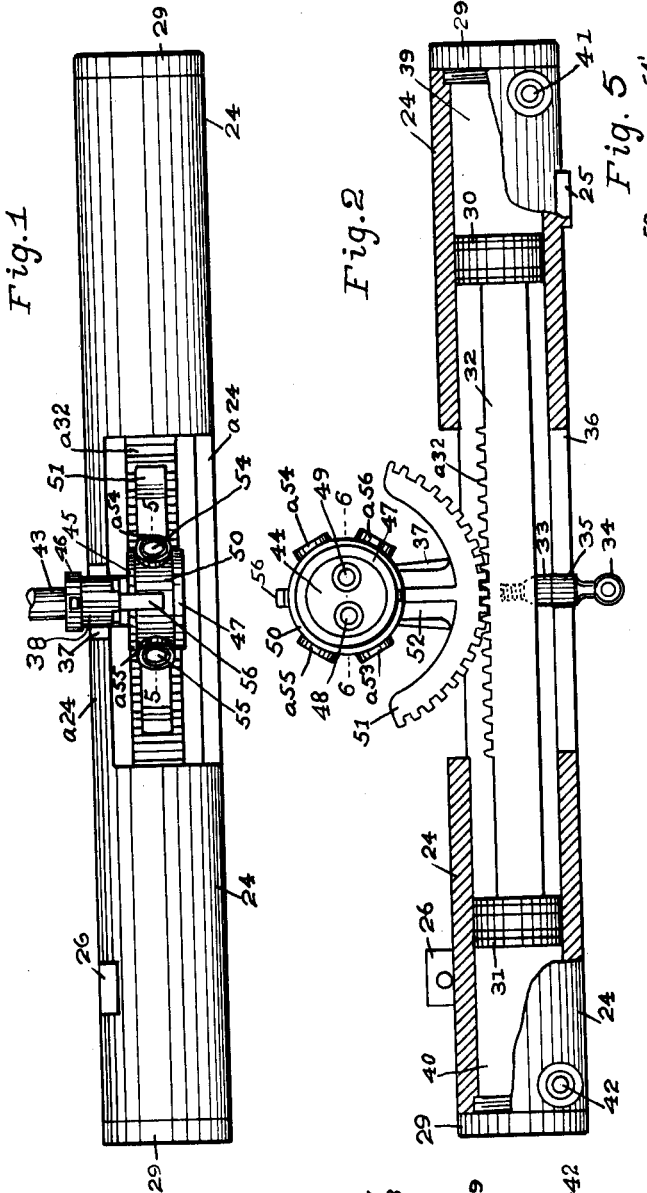

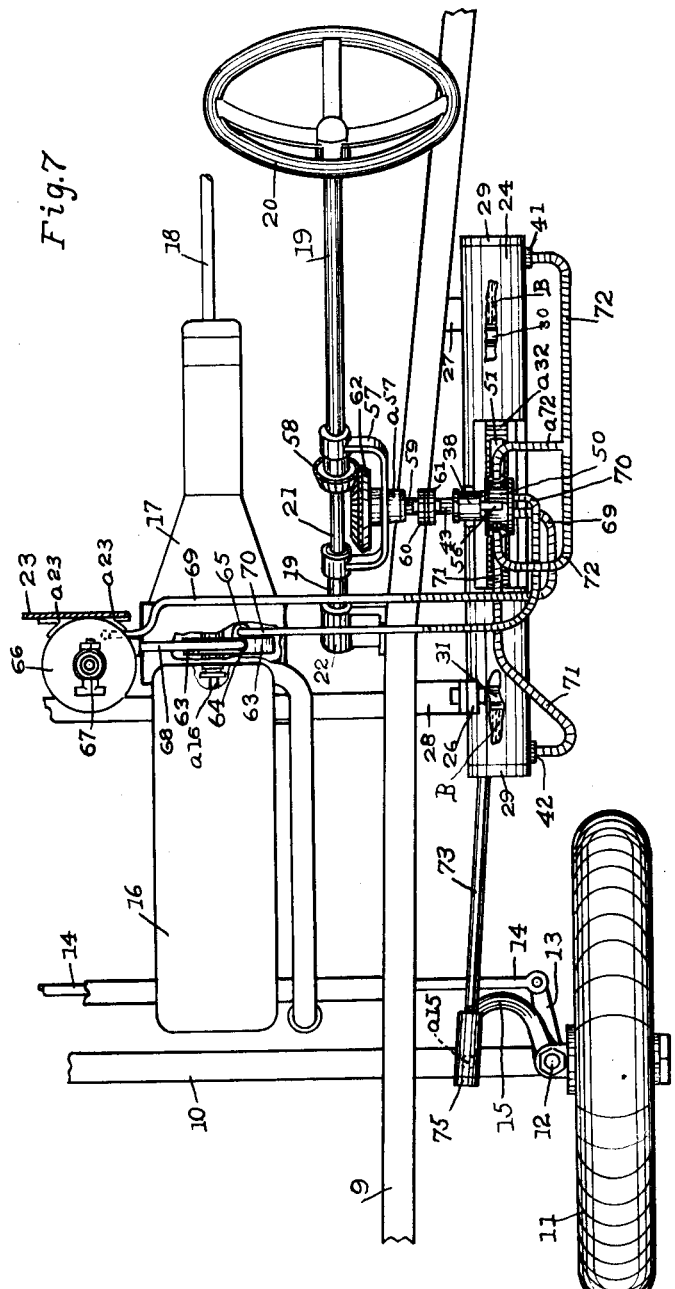

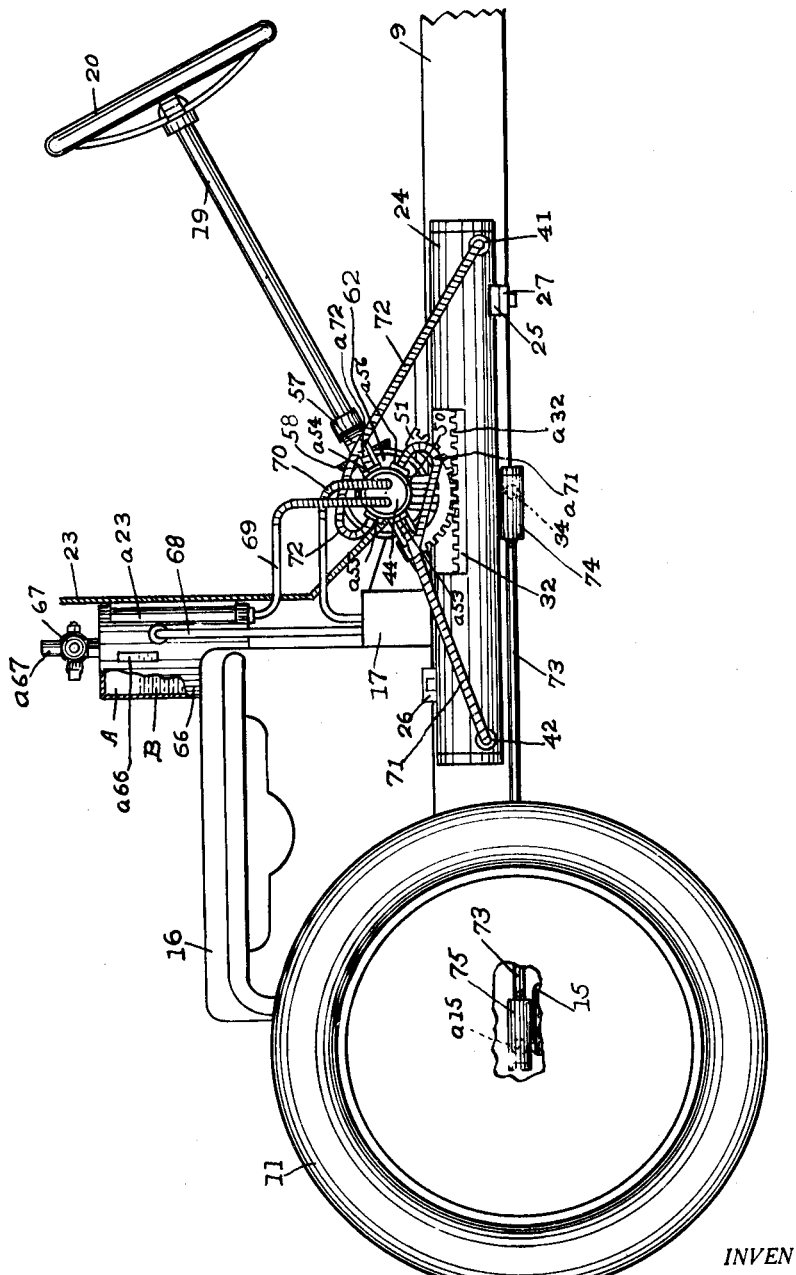

1,872,714

UNITED STATES PATENT OFFICE

OTIS N. FARLEY, OF LYNDEN, WASHINGTON

POWER STEERING MECHANISM FOR AUTOMOBILES

Application filed September 2, 1930. Serial No. 479,335.

My invention relates to improvements in power steering mechanisms for automobiles and has for an object to provide manually-controllable power means to change the direction of the steering wheels of an automobile and to retain the same in desired positions.

Another object of my improvement is to employ a non-compressible liquid for a medium to convey power control to the steering wheels.

Another object of my improvement is to provide a compressed-air cushion in conjunction with said liquid medium to maintain the effectiveness thereof.
Another object of my improvement is to provide a reaction of the power mechanism on the manual-control mechanism to automatically terminate manual control as soon as the manual-control mechanism ceases to move.

Another object of my improvement is to provide simple, durable, direct-acting mechanism wherewith to reduce my invention to practice.
Other objects of my improvement will appear as the description proceeds.

I attain these and other objects of my improvement with the mechanism illustrated in the accompanying three sheets of drawings forming a part of this specification in which Figure 1 is a plan view of the power piston and cylinder assembly used to direct steering wheel movements, Fig. 2 is a front elevation of Fig. 1 partly in section on a medial vertical plane, Fig. 3 is an end elevation of Fig. 2, Fig. 4 is a bottom plan view of a central portion of the cylinder assembly limited thereto, Fig. 5 is a vertical cross section of a portion of Fig. 1 on the line 5—5 thereof drawn on a larger scale, Fig. 6 is a plan view of a horizontal section of Fig. 2 on the line 6—6, drawn on a larger scale, Fig. 7 is a plan view of a portion of the chassis and running gear of an automobile with my power steering mechanism in place thereon drawn on a smaller scale, and Fig. 8 is a side elevation of Fig. 7.

Similar characters refer to similar parts throughout. Certain parts are broken away for lack of space or to show other parts hidden thereby.

With more particular reference to the designated parts: A portion of the front part of the side frame bar of an automobile chassis is shown at 9 and the front axle thereof is shown at 10 the other portions of bar and axle being broken away. The front wheel 11 is connected to the axle with the usual knuckle joint having pin bolt 12. To the knuckle is fastened spindle arm 13 to which is pivoted parallel bar 14. Also to the knuckle is fastened steering arm 15 having ball $a15$ on the free end thereof projected upward.

Gas engine 16 is mounted on cross bars fastened to the chassis side bars as usual, and has engine shaft $a16$ a small portion of which is shown through a broken-away part of the engine in Fig. 7. The transmission gear casing is shown at 17 and the transmission shaft at 18, a portion of the latter being broken away.

The steering wheel column 19 is fastened in bracket 22 on chassis bar 9. Steering wheel 20 is fastened to the upper end of steering-wheel shaft 21. A portion of the lower part of column 19 is cut away, exposing shaft 21, and joined by bearing bracket 57. A portion only of the dashboard is shown in section at 23.

Cylinder housing 24 has boss 25 across its bottom near the right-hand end thereof to which is fastened bracket 27 to fasten that end of the housing to chassis bar 9 and it also has boss 26 on its rear wall near the left-hand end thereof to which is fastened bracket 28 which also is fastened to chassis bar 9 to complete securing the cylinder housing in operative position. Screw caps 29, 29 are engaged in the ends of the cylinder housing to provide cylinder 39 in the right-hand end and cylinder 40 in the left-hand end of the housing. The bore of the housing is continuous from end to end making cylinders 39 and 40 to be of equal diameter and with coincident axes.

Cylinder housing 24 preferably is horizontal and its central part has an opening through its upper wall the full width of its bore and also a longitudinal slot 36 through its bottom wall, defining two cylinder bars a24, a24 by which the ends of the housing are joined.

Piston 30 is disposed for reciprocation in cylinder 39 and piston 31 is disposed for reciprocation in cylinder 40. These pistons are joined by bar 32, preferably integral therewith, and the bar has gear rack a32 on its top surface and stud 33 engaged in the longitudinal center of its bottom. Stud 33 has sleeve 35 engaged over its body and is extended through slot 36 with the sleeve contacting with the walls thereof to roll thereon. The stud also has ball 34 on its lower end.

Bearing bracket 37 projects upward from the longitudinal center of the back wall of housing 24 and has bearing 38 on its upper end with a bore at right angles with cylinders 39 and 40. In bearing 38 is mounted shaft 43 for revolution and this shaft has head 44 on its front end preferably integral therewith. Head 44 has flange 45 on its rear end which bears on the front end of bearing 38. Set ring 46 on shaft 43 bears on the rear end of bearing 38 to complete retention of the shaft in the bearing.

Cylinder 39 has inflow and outflow port 41 near its right-hand end and cylinder 40 has inflow and outflow port 42 near its left-hand end.

Head 44 has inflow port 48 in its front end connected with peripherial opening a48. Said head also has outflow port 49 in its front end connected with peripherial opening a49.

On head 44 is mounted valve port ring 50 for revolution retained in place against flange 45 by set ring 47 on the front end of the head. Arcuate gear 51 is fastened beneath ring 50 by arm 52 to engage with rack a32. Outflow ports 53 and 55 are in the left-hand side of ring 50 respectively below and above the horizontal center thereof and are one at a time connective with inflow port 48—a48 in head 44 as said head and ring relatively oscillate. Inflow ports 54 and 56 are in the right-hand side of ring 50 respectively above and below the horizontal center thereof and are connective with outflow port 49, a49 as said head and ring relatively oscillate. Bosses a53, a54, a55 and a56 on ring 50 provide added thickness to the ring at the locations of ports 53, 54, 55 and 56 respectively. The one set of ports 53 and 54 are preferably on a diameter of the ring and the other set of ports 55 and 56 are preferably on another diameter of the ring. Thus, head ports a48 and a49 simultaneously connect with ring ports 53 and 54 respectively or they simultaneously connect with ring ports 55 and 56 respectively, or they may be at their neutral position connecting with no ring ports as shown in full lines in Fig. 5.

As stated, bracket 57 retains the severed parts of steering-wheel column 19 in operative position. Integral with this bracket is bearing a57 with a bore at right angles with and its axis intersecting the axis of the shaft 21. In bearing a57 is mounted shaft 59 for revolution and on the front end of shaft 59 is fastened flange 60 which is fastened to flange 61 on the rear end of shaft 43 with a cushion washer intervening. The construction provides a non-rigid connection between shafts 43 and 59. On the upper part of the exposed section of steering wheel shaft 21 is fastened beveled spur gear 58 to revolve therewith. On the rear end of shaft 59 is fastened beveled spur gear 62 engaged with gear 58. The construction provides that the revolution of steering wheel 20 in either direction will revolve head 44 in the opposite direction. Preferably driving gear 58 is of smaller diameter than driven gear 62 and head 44 is caused to move at a less rate than hand wheel 20.

A rotary pump 63 is shown in Fig. 7 directly connected to engine shaft a16. This pump is driven directly by the automobile engine and has outflow port 64 and inflow port 65. A tank 66 to hold oil and air under pressure is shown fastened on the engine side of dashboard 23 by brackets a23. In the top of the tank 66 is fitted cock 67 having spout a67 with an interior thread for the engagement of pipes therewith. Through this cock oil is introduced as well as air under pressure. Glazed window a66 in the wall of the tank near the top thereof shows the top of the oil in the tank.

Pipe 68 connects the outflow port 64 of the pump 63 with tank 66 preferably near the top thereof. Pipe 69 connects the tank outlet, preferably in the bottom thereof, with inflow port 48 of head 44. Pipe 70 connects the outflow port 49 of head 44 with inflow port 65 of pump 63. Pipe 71 connects outflow port 53 of port ring 50 with the port 42 of cylinder 40. Short pipe a71 connects pipe 71 with inflow port 56 of the port ring 50 which is diagonally opposite said port 53 thereof. Pipe 72 connects outflow port 55 of port ring 50 with the port 41 of cylinder 39. And short pipe a72 connects pipe 72 with inflow port 54 of port ring 50 which is diagonally opposite said port 55 thereof.

Drag link 73 has socket sleeve 74 engaged on the right-hand end and socket sleeve 75 engaged on the left-hand end thereof. Sleeve 74 is engaged with ball 34 on stud 33 in universal-joint relation, and sleeve 75 is engaged with ball a15 on steering arm 15 in universal-joint relation.

Stop 56 is disposed between bosses a54 and a55 of port ring 50 and overhangs the same. It is fastened to flange 45 of head 44 and moves with the head to limit the oscillations thereof relative to port ring 50 by contacting with said bosses on the port ring.

To operate my power steering mechanism: it is assumed that all of the described pipes, cylinders 39 and 40, pump 63 and tank 66 are filled with oil B to near the top of the tank as indicated in Fig. 8. And that on top of the oil B in tank 66 is a volume of compressed air A. When engine 16 is running oil pump 63 is driven thereby and causes sufficient circulation of the oil in the pipes and cylinders to provide the interchange of oil between cylinders 39 and 40 which is required to move steering arm 15 in steering operation. As illustrated in full lines in Fig. 5, head 44 is in a neutral position relative to port ring 50 and there is no connection between the ports of the head and ring. Also, in the several views the mechanism is in neutral position and set for directing the vehicle in straight-ahead movement. Cylinders 39 and 40 are full of non-compressible oil under pressure causing pistons 30 and 31 and bar 32 therebetween to be firmly held in place which causes steering arm 15 to be also firmly held in place through drag link 73.

Now turn steering wheel 20 forward till head 44 is turned backward causing port $a48$ to occupy its dotted position at $a48'$ in full registry with port 53 of the port ring also causing port $a49$ to occupy its dotted position at $a49'$ in full registry with port 54 of the port ring 50. Stop 56 is so disposed relative to boss $a55$ that a small farther movement of the head 44 is possible in addition to that above noted before stop 56 will bear on boss $a55$. Rotary pump 63 will now draw oil from cylinder 39 and force it into cylinder 40 at the same rate causing the pistons to move backward thus causing drag link 73 to move backward to turn the vehicle front wheels, one of which is shown at 11, to direct the vehicle toward the right, which is the direction said forward turn of the steering wheel 20 causes when the usual steering mechanism is employed.

Steering wheel 20 was turned only far enough to cause full registry of the said ports and then allowed to rest, no force being required to retain it in place.

The rearward movement of rack $a32$, caused by said rearward movement of piston bar 32, caused a corresponding movement in gear segment 51 thus turning port ring 50 backward till ring port 53 moved to its dotted position, shown in Fig. 5, at 53' and ring port 54 to its dotted position at 54' thus causing the said ring ports to pass out of registry with the head ports 48 and 49 and stopping oil and piston movement, thus firmly holding the front vehicle wheels in the steering position to which said piston movement had taken them.

It is apparent that when steering wheel 20 is turned backward head 44 will be turned forward causing head ports $a48$ and $a49$ to register with ring ports 55 and 56 respectively and oil will be drawn from cylinder 40 and forced into cylinder 39 causing drag link 73 to move forward to turn the front vehicle wheels to direct the vehicle toward the left. Again, a left or backward movement of the steering wheel, when operating through the usual steering mechanism, will cause the vehicle to turn toward the left. Also, the forward movement of rack $a32$, caused by said backward steering wheel movement, will cause ring 50 to turn forward and, if the backward turning of steering wheel 20 ceases, the port ring will directly carry the ports thereof beyond those of head 44 and the oil and vehicle front wheels will cease the steering movements and the set of the front wheels will be retained by the stationary oil in cylinders 39 and 40 till head 44 again is moved to cause the ports thereof to register with those of port ring 50.

Especial attention is directed toward the reflex action of the steering mechanism whereby the steering movements of steering wheel 20 relays power control to operate the vehicle front wheels in steering movements and these power steering movements automatically cease directly following stopping of steering wheel 20. This reflex control results in close similarity between the described steering operations and the usual steering operations in that in both cases a moving steering wheel is followed by corresponding steering movements in the vehicle front wheels and a motionless steering wheel restrains the vehicle front wheels from steering movements.

I prefer that rotary pump 63 be of the two-engaged-gears type which, when properly proportioned and driven, will maintain sufficient pressure in air cushion A to operate pistons 30 and 31 to overcome the resistance of the front automobile wheels to oscillate in steering operation. This type of pump, also, will allow the oil to slip past the said gears and yet maintain standard pressure of the air cushion when the valves are closed against oil movement through the pipes. Of course, it is not essential that the pump be directly connected to the engine shaft, as shown. However this can be arranged for by placing stuffing box glands on the pump bearings around the said shaft.

Air cushion A is useful in providing a degree of resilience in what otherwise would be quite rigid liquid links. Furthermore, in case of slight leakages in the system, the air cushion will, for a time maintain the pipes and cylinders full of oil, although at slightly reduced pressure.

Having thus disclosed my invention, what I claim as new therein and desire to secure by Letters Patent is,—

Power steering mechanism for automobiles including two cylinders of equal diameter, each having one closed end, having their open ends joined by bars with openings therebetween to dispose the cylinders on the same axis each having a port adjacent its closed end, means to fasten the cylinders to the chassis of the automobile to dispose the same lengthwise of the chassis, two pistons one mounted for reciprocation in each cylinder joined by a piston bar having a gear rack on one side disposed beneath one of the openings between the cylinder bars, a stud engaged in the piston bar having one end extended through an opening between the cylinder bars, the steering arm of the front wheels of the automobile to oscillate the same in steering operation, a drag link pivoted to the steering arm and to the stud on the piston bar to oscillate the steering arm by piston reciprocation, a bearing fastened to one of the cylinder bars, a valve shaft mounted for revolution in the bearing disposed above and at right angles with the cylinder axis, a rotary valve head fastened on the outer end of the valve shaft disposed adjacent the piston bar having diametrically opposite outflow and inflow valve ports, the steering-wheel shaft of the automobile, mechanical driving connections between the steering-wheel shaft and the valve shaft, a valve-port ring mounted for oscillation on the valve head having the one and the other sets of two diametrical outflow and inflow valve ports, a gear segment fastened to the valve ring disposed to engage with the piston-bar rack to cause valve ring oscillation by piston reciprocation, a closed tank, a pump having an outflow port and an inflow port, power means to operate the pump, a pipe from the outflow port of the pump to the tank, conduit connections from the tank to the outflow port of the valve head, conduit connections from the inflow port of the pump to the inflow port of the valve head, conduit connections from one of the outflow ports of the valve ring to the port of the front cylinder, conduit connections from the other outflow port of the valve ring to the rear cylinder port joined with conduit connections from the one inflow port of the valve ring, and liquid to occupy the cylinders, the pipes, the pump, and the tank disposed in the tank to provide an air chamber in the top thereof.

OTIS N. FARLEY.